(12) United States Patent
Bohr et al.

(10) Patent No.: US 9,231,456 B2
(45) Date of Patent: Jan. 5, 2016

(54) BRUSH DEVICE FOR AN ELECTRIC MACHINE, AND ELECTRIC MACHINE

(71) Applicant: Robert Bosch GmbH, Stuttgart (DE)

(72) Inventors: Peter Bohr, Karlsruhe (DE); Tarek Mili, Lauterbourg (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/469,646

(22) Filed: Aug. 27, 2014

(65) Prior Publication Data

US 2015/0061454 A1 Mar. 5, 2015

(30) Foreign Application Priority Data

Aug. 27, 2013 (DE) .......................... 10 2013 217 077

(51) Int. Cl.
| | |
|---|---|
| H02K 13/00 | (2006.01) |
| H01R 39/40 | (2006.01) |
| H02K 5/14 | (2006.01) |
| H01R 39/26 | (2006.01) |
| H02K 13/10 | (2006.01) |
| H01R 39/38 | (2006.01) |

(52) U.S. Cl.
CPC ................ *H02K 13/00* (2013.01); *H01R 39/26* (2013.01); *H01R 39/40* (2013.01); *H02K 5/148* (2013.01); *H02K 13/10* (2013.01); *H01R 39/381* (2013.01)

(58) Field of Classification Search
USPC .................................................. 310/219–253
See application file for complete search history.

(56) References Cited

U.S. PATENT DOCUMENTS

| | | | |
|---|---|---|---|
| 2,991,379 A | 7/1961 | Van Dam | |
| 5,453,646 A * | 9/1995 | Gleixner et al. | 310/51 |
| 6,552,466 B2 * | 4/2003 | Schwabbauer et al. | 310/248 |
| 8,040,016 B2 * | 10/2011 | Fournier et al. | 310/251 |
| 2007/0236096 A1 * | 10/2007 | Dorner | 310/241 |
| 2010/0289360 A1 * | 11/2010 | Grabner et al. | 310/85 |
| 2013/0038156 A1 | 2/2013 | Mao et al. | |

FOREIGN PATENT DOCUMENTS

| | | |
|---|---|---|
| DE | 102009001714 | 9/2010 |
| JP | 2002369458 | 12/2002 |
| JP | 2003088050 | 3/2003 |
| JP | 2003164117 | 6/2003 |

* cited by examiner

*Primary Examiner* — Naishadh Desai
(74) *Attorney, Agent, or Firm* — Michael Best & Friedrich LLP

(57) ABSTRACT

A brush device (100) for an electric machine (10), having a brush (20) which is arranged in a brush guide element (21; 21a) so as to be longitudinally displaceable in the direction of a contact element (16) and which bears against the contact element (16) by way of a contact surface (30), wherein the brush (20) has a longitudinal axis (25) arranged at a first oblique angle ($\alpha$) with respect to an axis of rotation (11) of the contact element (16), wherein that face side (23) of the brush (20) which is situated opposite the contact surface (30) is subjected to the spring force (F) of a spring element (32) in an abutment region (31).

19 Claims, 2 Drawing Sheets

BRUSH DEVICE FOR AN ELECTRIC MACHINE, AND ELECTRIC MACHINE

BACKGROUND OF THE INVENTION

The invention relates to a brush device for an electric machine. The invention also relates to an electric machine using a brush device.

A brush device is known from JP 2002369458 A. In the case of the known brush device, in order to reduce vibrations, it is provided that the brush, which has a rectangular cross-sectional area, is arranged, together with a brush guide element, at a first oblique angle with respect to the longitudinal axis or axis of rotation of a commutator. That face side of the brush which faces toward a commutator lies with its entire cross section against the commutator, so as to form a contact surface. Furthermore, that face side of the brush which faces away from the contact surface has a groove in which a leg of an obliquely arranged spring bears. The spring generates not only a first force component in the direction of the commutator but also a second force component which pushes the brush in the direction of a wall of the brush guide element. If vibrations are generated at the contact surface on the side facing away from said wall of the brush guide element, it is the case even in the presence of relatively low frictional forces that a relatively high tilting moment is generated on the brush, which has an adverse effect in terms of noise generation and vibration reduction, because, owing to the normal manufacturing tolerances between the cross section of the brush and the brush guide element, the brush is guided in the brush guide element with play, and the tilting moment thus leads to an abutment of the brush in the brush guide element.

Furthermore, DE 10 2012 107 327 A1 has disclosed a further brush device in which the brush, which has a rectangular cross section, is arranged within a brush guide element with play in order that, in particular, the longitudinal displaceability of the brush in the brush guide element is ensured. Owing to the guidance with play, a brush device of said type tends to exhibit vibrations. Therefore, in the case of the known brush device, provision is made for the brush guide element and thus also the brush to be inclined at a first oblique angle of 75° to 82° with respect to the longitudinal axis or axis of rotation of a commutator which constitutes the contact element. That face side of the brush which faces away from the contact element (lamella of the commutator) is subjected to the spring force of a spring element, wherein the direction of the spring force runs perpendicular to the longitudinal axis of the contact element and/or to the axis of rotation of the commutator. The spring force of the spring element generates not only the pressure force of the brush against the contact element but also, on that face side of the brush which faces away from the spring element, a force component which pushes the brush in the direction of a side surface of the brush guide element. A disadvantage of said brush device is that, owing to the selected angle of the brush guide element with respect to the axis of rotation of the contact element, with a certain desired pressure force of the brush against the commutator, the pressure force acting on the brush in the direction of the brush guide element is relatively low. Furthermore, owing to the direction of the spring force, which is oriented at least substantially perpendicular to the axis of rotation of the contact element (commutator), there is a tendency for a pressure force to be generated on the brush which is not of uniform magnitude over the length of the brush in the brush guide element, and which in particular decreases in the direction of that side of the brush which faces away from the contact element. As a result, the vibration damping capability of the known brush device is restricted, because in particular, a pressure force which is uniform or which has a certain minimum magnitude over the entire length of the brush is not obtained.

SUMMARY OF THE INVENTION

Taking the presented prior art as a starting point, it is the object of the invention to further develop a brush device for an electric machine as per the preamble of claim 1 such that improved vibration damping of the brush in the brush guide element can be obtained.

Said object is achieved according to the invention, in the case of a brush device for an electric machine, in that that face side of the brush which faces toward the contact element bears against the contact element only by way of a subregion that forms the contact surface. In this way, it is also only possible for vibrations to arise in the contact surface that is reduced in relation to the prior art (in relation to a contact surface that bears against a contact element over the entire face side of a brush), such that the effects of the vibrations can be reduced, because that region of the brush which does not form a contact surface can be utilized for the guidance of the brush in the brush guide element, which, in the presence of normal manufacturing tolerances, reduces the possible tilting angle.

In a preferred geometric embodiment of the reduced contact surface, which can be realized in a particularly simple manner from a manufacturing aspect, it is provided that a first bevel is formed on that face side of the brush which is assigned to the contact surface of the brush, such that the face side of the brush bears against the contact element, so as to form the contact surface, only in the region outside the first bevel.

In a very particularly preferred embodiment, it is provided that the contact surface is arranged on that side of the brush guide element which faces toward the wall and against which the brush is forced by the spring element. Here, it is preferably provided that the contact surface extends at most as far as the longitudinal axis of the brush.

To obtain and influence the force exerted on the brush by the spring element in the direction of the brush guide element, it is provided that that face side of the brush which is situated opposite the contact surface has, at least in the abutment region of the spring element, a second bevel which is arranged at a second oblique angle with respect to the longitudinal axis of the brush. Such a design of the brush can be produced in a particularly simple manner from a manufacturing aspect, wherein the magnitude of the force components of the spring element can be influenced through the selection of the second angle.

To obtain the desired abutment force of the brush against its brush guide element and the required contact force against the contact element, it has proven to be advantageous for the first oblique angle to be between 60° and 80°, preferably between 70° and 75°. Such an arrangement makes it possible, with a brush device of compact construction, to obtain relatively high abutment forces of the brush in the brush guide element.

It is furthermore preferable for the second oblique angle at which the abutment surface for the spring element is arranged with respect to the longitudinal axis of the brush to be between 30° and 60°, preferably approximately 45°, and for the spring force of the spring element to run at least approximately perpendicular to the abutment region.

It may furthermore advantageously be provided that the two bevels are arranged on the same side of the brush with respect to the longitudinal axis thereof. This has the effect firstly that the required abutment force of the brush in the brush guide element is generated, and secondly that the force with which the brush bears against the contact element in the region of the contact surface acts on that side of the brush guide element at which the brush also bears with the abutment force against the brush guide element.

In a preferred geometric embodiment of the brush and of the brush guide element, it is proposed that the brush and the brush guide element each have an at least approximately square cross section.

In a first option with regard to the geometric arrangement of the brush guide element with respect to the contact element, it is proposed that the side or boundary walls of the brush guide element are arranged at least substantially at right angles or parallel to the axis of rotation of the contact element. Such an arrangement has the effect that the abutment force of the brush against the brush guide element acts only in the region of a single side surface of the brush guide element.

It is however alternatively also possible for the side walls of the brush guide element to be oriented at an angle of at least approximately 45° with respect to the axis of rotation of the contact element. Such a rotated arrangement of the brush guide element and of the brush permits a situation in particular in which the abutment force of the brush in the brush guide element presses the brush in a corner region of the brush guide element. Such an arrangement, which to a certain extent permits self-centering of the brush in the cross section of the brush guide element, is advantageous in particular in the case of machines whose direction of rotation can be reversed, because here, the tendency for vibrations to occur during the reversal of direction of rotation is additionally reduced or eliminated.

It is preferable for the described brush device to be used in an electric motor, wherein the contact element is in the form of a lamella of a brush-type electric motor.

It is furthermore very particularly preferable for a brush device according to the invention to be used in drive motors, whose direction of rotation is reversible, in comfort drives of motor vehicles. In the case of comfort drives of said type, a major aspect is in particular that of eliminating noises, which can be achieved in a simple and effective manner by way of the configuration of the brush device according to the invention.

BRIEF DESCRIPTION OF THE DRAWINGS

Further advantages, features and details of the invention will emerge from the following description of preferred exemplary embodiments and on the basis of the drawing, in which.

Identical elements or elements of identical function are denoted by the same reference signs in the figures.

DETAILED DESCRIPTION

Figure 1:
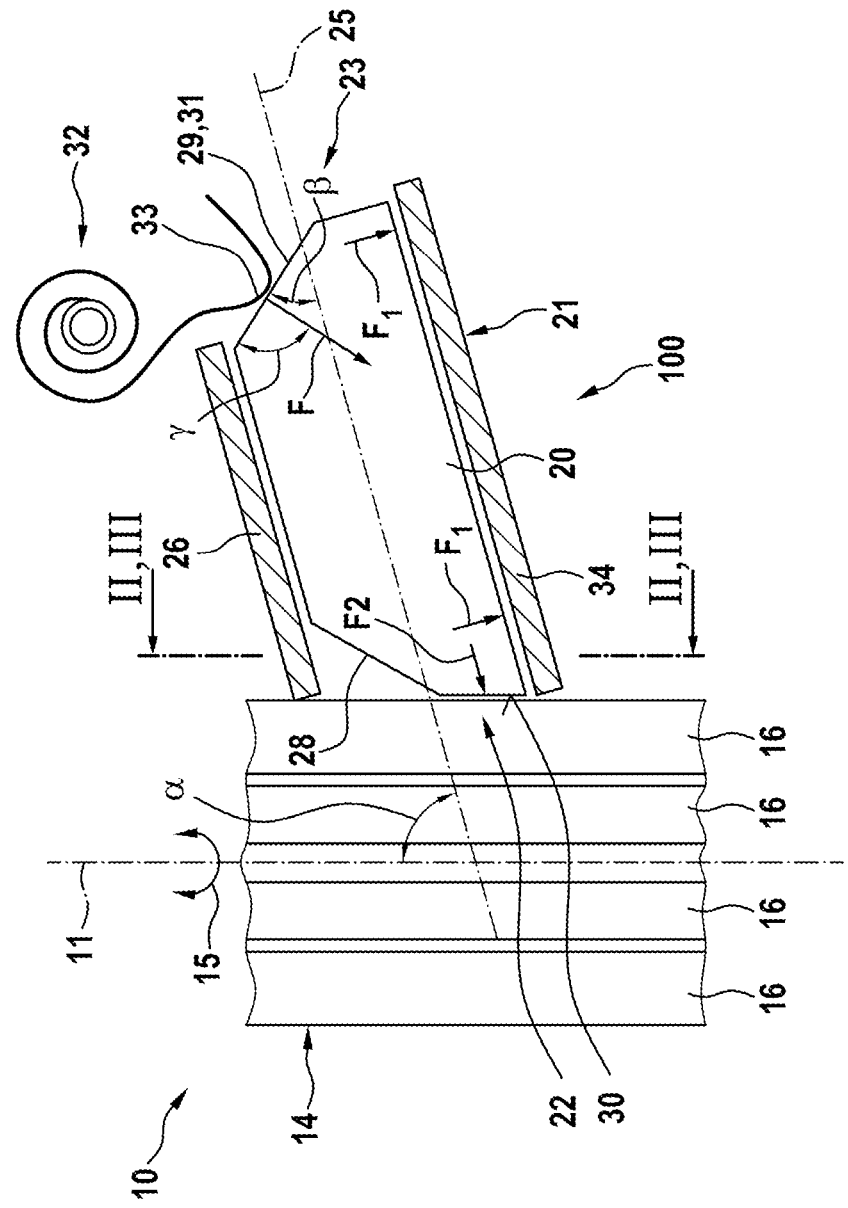
FIG. 1 shows a simplified, partially sectional side view of a first brush device according to the invention, in which the side walls of the brush guide element are oriented parallel or perpendicular to the axis of rotation of the contact element or commutator.

FIG. 1 illustrates, in simplified form, a part of an electric machine 10. The present exemplary embodiment concerns a brush-type direct-current motor, which is preferably used in a comfort drive of a motor vehicle, though this is not restrictive. Here, within the context of the invention, a comfort drive is to be understood in particular to mean a reversible electric motor, that is to say an electric motor whose direction of rotation is reversible, in particular a window lifter motor, a sliding roof motor, a seat adjustment drive, or the like.

In the electric machine 10, if the latter is a brush-type direct-current motor, a commutator 14 is arranged on a shaft (not illustrated) with a longitudinal axis 11. The commutator 14 is arranged so as to be rotatable about the longitudinal axis 11 in the direction of the double arrow 15, and in a known manner, has elongate commutator lamellae, which are arranged electrically separately from one another and which will hereinafter be referred to merely as lamellae 16, on its circumference. The lamellae 16 are arranged, parallel to the longitudinal axis 11 or axis of rotation of the commutator 14, on a pitch circle diameter. In the case of a generator, this would be a slip ring, but in both cases, this is a contact element which is mounted rotatably about the longitudinal axis 11 and which rotates. A brush device 100 according to the invention is also shown in FIG. 1.

The brush device 100 has the required number of brushes 20 or sliding contacts, wherein only a single brush 20 is illustrated in the figures. The brush 20 is produced from carbon or from some other suitable material. At least in a subregion of its length, the brush 20 is arranged in a manner known per se in a brush guide element 21, which is in particular in the form of a plastics injection-molded part, so as to be longitudinally displaceable in the direction of the lamellae 16. In the exemplary embodiment illustrated, the brush 20 has, aside from in the region of its two face-side end regions 22, 23, an at least approximately square cross section in each case. Likewise, the brush guide element 21 has an internal cross section which is matched to the cross section of the brush 20, that is to say which is likewise of square form. The cross section of the brush 20 is arranged within the cross section of the brush guide element 21 with preferably only a relatively small amount of play, which ensures the longitudinal displaceability of the brush 20 in the brush guide element 21.

The brush 20 has a longitudinal axis 25 which runs within the square cross section of the brush 20 in the center of area of the brush 20. The longitudinal axis 25 of the brush 20 intersects the longitudinal axis 11 of the commutator 14. Furthermore, the longitudinal axis 25 of the brush 20 is arranged so as to be inclined with respect to the longitudinal axis 11 of the commutator 14 by a first oblique angle $\alpha$. The first oblique angle $\alpha$ is between 60° and 80°, preferably between 70° and 75°.

The two face sides or face-side end regions 22, 23 of the brush 20 have, in each case on the same side in relation to the longitudinal axis 25, in the illustrated exemplary embodiment on the side of an upper wall 26 of the brush guide element 21, a respective bevel 28, 29 running over the entire width of the brush 20 (that is to say perpendicular to the plane of the drawing of FIG. 1). The first bevel 28, which is assigned to the face-side end region 22, is arranged and/or designed such that the contact surface 30, which bears against the lamellae 16, of the brush 20 bears against the commutator 14 approximately at most over half of the height of the brush 20, that is to say as far as the height of the longitudinal axis 25. The second bevel 29, which is assigned to the face-side end region 23, of the brush 20 serves as an abutment region 31 for a spring element 32 which bears by way of a leg 33 against the abutment surface 31 and which exerts a spring force F on the brush 20. The second bevel 29 is arranged so as to be inclined with respect to the longitudinal axis 25 of the brush 20 by an angle β of between 40° and 70°, preferably approximately 45°. The leg 33 of the spring element 32 is arranged and/or designed such that the spring force F acts on the abutment surface 31 at an oblique angle y which is preferably 90° with respect to the abutment surface 31, though this is not restrictive. It is essential that the second bevel 29 is oriented obliquely or at an oblique angle with respect to the longitudinal axis 11, that is to say does not run parallel to the longitudinal axis 11.

The spring force F of the spring element 32 exerts on the brush 20 a first force component F1 which runs perpendicular to the longitudinal axis 25 of the brush 20 and which forces or presses the brush 20, with a force that is at least approximately uniform over the entire length in the brush guide element 21, against the lower wall 34 of the brush guide element 21. Furthermore, the spring force F generates a second force component F2 which presses the brush 20 against the contact element or the lamellae 16 in the region of the abutment surface 30—in particular in the direction of the longitudinal axis 25.

The magnitude of the force components F1 and F2 can be influenced or adjusted by way of a variation of the angle β of the second bevel 29, the arrangement of the spring element 32 and/or of the leg 33, and by way of a variation of the first oblique angle α and of the oblique angle γ.

Figure 2:
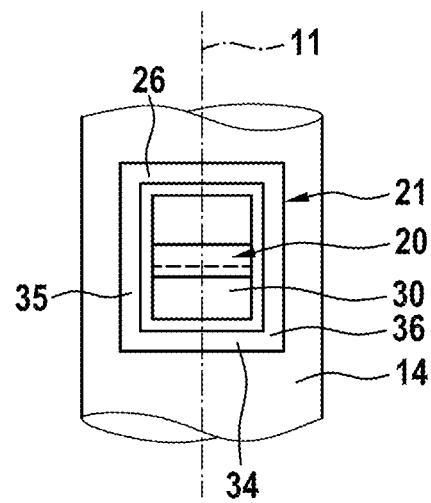
FIG. 2 shows a cross section in the direction II-II in FIG. 1.

As can be seen in particular from FIG. 2, in the case of the brush device 100 as per FIG. 1, the brush guide element 21 is arranged such that the two walls 26, 34 (or the cross-sectional lines) are, in the cross section illustrated in FIG. 2, arranged perpendicular to the longitudinal axis 11 and perpendicular to the lamellae 16. Furthermore, the two side walls 35, 36 of the brush guide element 21 are arranged parallel to the longitudinal axis 11.

Figure 3:
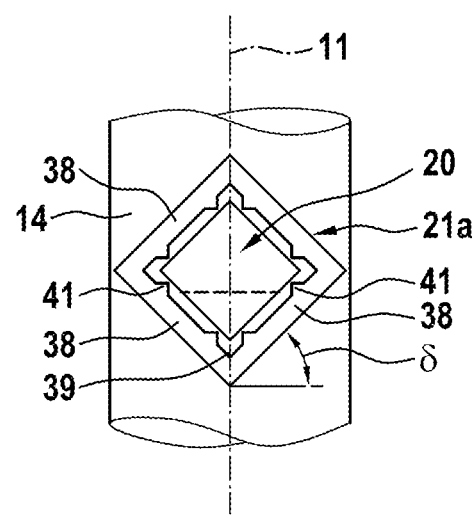
FIG. 3 shows a cross section in the direction III-III in FIG. 1 with an arrangement modified in relation to FIG. 1, in which the brush guide element has been rotated or pivoted through 45°.

FIG. 3 illustrates a modified brush device 100 in which the brush guide element 21a is in an arrangement pivoted through an angle δ of 45°, with respect to the longitudinal axis 11 of the commutator 14, in relation to the brush guide element 21. This means that the four side walls 38 of the brush guide element 21a are each arranged at an angle δ of 45° with respect to the longitudinal axis 11. It can also be seen that the spring force F on the brush 20 arranged within the cross section of the brush guide element 21a generates a force which presses the brush 20 in the direction of a lower corner region 39 of the brush guide element 21a. It is finally possible to see, within the cross section of the brush guide element 21a, longitudinal ribs 41 which run in the longitudinal direction of the brush guide element 21a and which serve for linear abutment of the brush 20 against the brush guide element 21a.

The brush device 100 thus described may be altered or modified in a variety of ways without departing from the concept of the invention. In particular, it is conceivable for the brush 20 to have a cross section which is rectangular rather than square.

What is claimed is:

1. A brush device (100) for an electric machine (10), having a brush (20) which is arranged in a brush guide element (21; 21a) so as to be longitudinally displaceable in a direction of a contact element (16) having an axis of rotation, wherein the brush bears against the contact element (16) by way of a contact surface (30), wherein the brush (20) has a longitudinal axis (25) which runs within a cross section of the brush in a center area of the brush, the longitudinal axis of the brush intersecting the axis of rotation of the contact element and being arranged at a first oblique angle (α) with respect to the axis of rotation (11) of the contact element (16), the first oblique angle (α) being between 60° and 80°, wherein a face side (23) of the brush (20) which is situated opposite the contact surface (30) is subjected to a spring force (F) of a spring element (32) in an abutment region (31), which spring force, on the brush (20), has a first force component (F1) acting perpendicular to the longitudinal axis, and has a second force component (F2) acting in the direction of the longitudinal axis, wherein the first force component presses the brush (20) at least regionally against a wall (34; 38) of the brush guide element (21; 21a), characterized in that a face side (22) of the brush (20) which faces toward the contact element (16) bears against the contact element (16) only by way of a subregion that forms the contact surface (30).

2. The brush device according to claim 1, characterized in that a first bevel (28) is formed on the face side (22) of the brush (20) which is assigned to the contact surface (30) of the brush (20), such that the face side (22) of the brush (20) bears against the contact element (16), so as to form the contact surface (30), only in a region outside the first bevel (28).

3. The brush device according to claim 1, characterized in that the contact surface (30) is arranged on a side of the brush guide element (21; 21a) which faces toward the wall (34; 38) and against which the brush (20) is forced by the spring element (32).

4. The brush device according to claim 2, characterized in that the contact surface (30) extends at most as far as the longitudinal axis (25) of the brush (20).

5. The brush device according to claim 2, characterized in that the face side (23) of the brush (20) which is situated opposite the contact surface (30) has, at least in the abutment region (31) of the spring element (32), a second bevel (29) which is arranged at a second oblique angle (β) with respect to the longitudinal axis (25) of the brush (20).

6. The brush device according to claim 2, characterized in that the face side (23) of the brush (20) which is situated opposite the contact surface (30) has, at least in the abutment region (31) of the spring element (32), a second bevel (29) which is arranged at a second oblique angle (β) with respect to the longitudinal axis (25) of the brush (20) and which is also oriented obliquely with respect to the axis of rotation (11).

7. The brush device according claim 1, characterized in that the second oblique angle (β) is between 40° and 70°, and in that the spring force (F) acting on the brush (20) runs at least approximately perpendicular to the abutment region (31).

8. The brush device according to claim 5, characterized in that the first and second bevels (28, 29) are arranged on a same side of the brush (20) with respect to the longitudinal axis (25) thereof.

9. The brush device according to claim 5, characterized in that the first oblique angle (α) is between 70° and 75°.

10. The brush device according claim 1, characterized in that the second oblique angle (β) is approximately 45°, and in that the spring force (F) acting on the brush (20) runs at least approximately perpendicular to the abutment region (31).

11. The brush device according to claim 5, characterized in that the first and second bevels (28, 29) are arranged on a same side axially with respect to the axis of rotation (11) of the brush (20) with respect to the longitudinal axis (25) thereof.

12. The brush device according to claim 1, characterized in that the brush (20) and the brush guide element (21; 21a) each have an at least approximately square cross section.

13. The brush device according to claim 12, characterized in that boundary walls (26, 34 to 36) of the brush guide element (21) are arranged at least substantially at right angles or parallel to the axis of rotation (11) of the contact element (16).

14. The brush device according to claim 12, characterized in that boundary walls (38) of the brush guide element (21a)

are oriented at an angle (δ) of approximately 45° with respect to the axis of rotation (11) of the contact element (16).

15. The brush device according to claim 12, characterized in that boundary walls (38) of the brush guide element (21*a*) are oriented at an angle (δ) of approximately 45° with respect to a plane perpendicular to the axis of rotation (11) of the contact element (16).

16. The brush device according to claim 1, characterized in that the contact element (16) is in the form of a lamella of a brush-type electric motor.

17. The brush device according to claim 1, characterized in that the spring element (32) has a spring leg (33) which is rotatable about a torsion axis of the spring element (32) and which bears against the brush (20) at the abutment region (31), and the torsion axis is oriented transversely to the axis of rotation (11) of the contact element (16).

18. The brush device according to claim 1, characterized in that the spring element (32) has a spring leg (33) which is rotatable about a torsion axis of the spring element (32) and which bears against the brush (20) at the abutment region (31), and the torsion axis is oriented perpendicular to the axis of rotation (11) of the contact element (16).

19. The brush device according to claim 2, wherein the first bevel runs over an entire width of the brush perpendicular to a plane defined by the longitudinal axis and the axis of rotation.

* * * * *